(12) United States Patent
Taki et al.

(10) Patent No.: US 11,261,545 B2
(45) Date of Patent: Mar. 1, 2022

(54) CARBON FIBER PRODUCTION METHOD (71) Applicant: Toray Industries, Inc., Tokyo (JP)

(72) Inventors: Kosuke Taki, Ehime (JP); Hiroomi Ueda, Ehime (JP); Hiroyuki Konishi, Ehime (JP)

(73) Assignee: Toray Industries, Inc., Tokyo (JP)

( * ) Notice: Subject to any disclaimer, the term of this patent is extended or adjusted under 35 U.S.C. 154(b) by 278 days.

(21) Appl. No.: 16/612,261

(22) PCT Filed: Mar. 8, 2018

(86) PCT No.: PCT/JP2018/009001
§ 371 (c)(1),
(2) Date: Nov. 8, 2019

(87) PCT Pub. No.: WO2018/230055
PCT Pub. Date: Dec. 20, 2018

(65) Prior Publication Data
US 2021/0054540 A1 Feb. 25, 2021

(30) Foreign Application Priority Data
Jun. 13, 2017 (JP) .............................. JP2017-115670

(51) Int. Cl.
*D02J 13/00* (2006.01)
*D06M 15/507* (2006.01)
(Continued)

(52) U.S. Cl.
CPC ................ *D01F 9/328* (2013.01); *D01F 9/22* (2013.01); *D02J 13/008* (2013.01); *F23G 7/065* (2013.01);
(Continued)

(58) Field of Classification Search
CPC .... D01F 9/20; D01F 9/22; D02J 13/00; D02J 13/008; D06M 15/507; D06M 15/53;
(Continued)

(56) References Cited

U.S. PATENT DOCUMENTS 4,552,743 A * 11/1985 Torigata .................... D01F 9/22
264/29.2
5,994,261 A * 11/1999 Tai .......................... D01F 9/145
423/447.6
(Continued)

FOREIGN PATENT DOCUMENTS

| CN | 102954700 A | * | 3/2013 | ............. F27D 17/00 |
| JP | 59-142826 A | | 8/1984 | |

(Continued)

OTHER PUBLICATIONS

Translation of CN 102954700 A (published on Mar. 6, 2013).*
(Continued)

*Primary Examiner* — Leo B Tentoni
(74) *Attorney, Agent, or Firm* — DLA Piper LLP (US)

(57) ABSTRACT

A carbon fiber production method includes a carbon fiber production step including an oxidation step and a carbonization step; and an exhaust gas processing step including a heat exchange step; an external air mixing step; and a mixed external air supplying step in which the mixed external air is supplied to at least one step that uses heated gas in the steps in the carbon fiber production step; and among the exhaust gases, a high heating value exhaust gas having a heating value of 250 kcal/Nm$^3$ or higher is supplied to an inlet side of an exhaust gas combustion apparatus and a low heating value exhaust gas having a heating value lower than 150 kcal/Nm$^3$ is supplied to an outlet side of the exhaust gas combustion apparatus, respectively.

8 Claims, 1 Drawing Sheet

(51) Int. Cl.
| | |
|---|---|
| *D06M 15/53* | (2006.01) |
| *D06M 15/55* | (2006.01) |
| *D06M 15/564* | (2006.01) |
| *F23G 7/06* | (2006.01) |
| *F23L 15/00* | (2006.01) |
| *F23L 15/04* | (2006.01) |
| *F23N 3/04* | (2006.01) |
| *F27D 17/00* | (2006.01) |
| *D01F 9/32* | (2006.01) |
| *D01F 9/22* | (2006.01) |
| *F23L 7/00* | (2006.01) |
| *F23N 3/00* | (2006.01) |
| *D01F 9/20* | (2006.01) |

(52) U.S. Cl.
CPC .............. *F23L 7/007* (2013.01); *F23L 15/045* (2013.01); *F23N 3/002* (2013.01); *F23N 3/042* (2013.01); *D01F 9/20* (2013.01); *F23G 2206/20* (2013.01); *F23G 2209/14* (2013.01); *F23G 2900/55001* (2013.01)

(58) Field of Classification Search
CPC ....... D06M 15/55; D06M 15/564; F23G 7/06; F23G 7/065; F23G 2206/20; F23G 2209/14; F23G 2900/55001; F23L 7/007; F23L 15/00; F23L 15/04; F23L 15/045; F23N 3/002; F23N 3/04; F23N 3/042; F27D 17/00
USPC .......... 264/29.2, 130, 345; 423/447.6; 431/5
See application file for complete search history.

(56) References Cited

U.S. PATENT DOCUMENTS

2013/0089736 A1* 4/2013 Nakayama ............ D06M 15/55
428/375
2017/0370580 A1 12/2017 Yamamoto et al.

FOREIGN PATENT DOCUMENTS

| JP | 2006-308275 A | 11/2006 |
|---|---|---|
| JP | 2009-174078 A | 8/2009 |
| JP | 2012-246598 A | 12/2012 |
| JP | 2013-32608 A | 2/2013 |
| WO | 2016/117167 A1 | 7/2016 |

OTHER PUBLICATIONS

The First Chinese Office Action dated Aug. 27, 2021, of counterpart Chinese Application No. 201880038554.7, along with an English translation.
Wu, Dewong, "On Process Design of Chemical Plants," East China University of Technology Press, 1$^{st}$ Edition, p. 163, Apr. 30, 2014, along with p. 3 of the English translation of the Chinese First Office Action, which is a concise summary relating this publication to the rejections therein.
Wang, Shu, "Introduction to High-tech Fibers," Donghua University Press, 1$^{st}$ Edition, p. 420, Jun. 30, 3014, along with p. 3 of the English translation of the Chinese First Office Action, which is a concise summary relating this publication to the rejections therein.
Song, Xiaoquan, "Chemical Small Commodity Production Act," Human Science and Technology Press, vol. 15, 1$^{st}$ Edition, pp. 150-152, Sep. 30, 1993, along with p. 3 of the English translation of the Chinese First Office Action, which includes a concise summary relating this publication to the rejections therein.

* cited by examiner

CARBON FIBER PRODUCTION METHOD

TECHNICAL FIELD

This disclosure relates to a carbon fiber production method using an exhaust gas processing apparatus having a specific configuration.

BACKGROUND

Carbon fibers are used in wide variety of applications as reinforcing fiber materials for fiber reinforced plastics owing to its advantageous properties such as high specific strength, high specific modulus, low specific electrical resistance, and high chemical resistance. When the carbon fiber is produced, for example, from polyacrylonitrile fiber (PAN fiber) as a precursor fiber thereof, the production method, by way of examples, mainly consists in the following steps.

Briefly, the production method comprises the steps of: unwinding in which PAN fiber is unwound from a package thereof; oxidation in which the precursor fiber is subjected to an oxidation treatment in an oxidation oven at a temperature of 200 to 300° C. in an oxidizing gas such as air to obtain an oxidized fiber; carbonization in which the oxidized fiber is subjected to a carbonization treatment in a carbonization furnace at a temperature of 300 to 2000° C. in an inert atmosphere to obtain a carbon fiber; optional graphitization in which the fiber is treated at a higher temperature; surface treatment in which the resultant carbon fiber is surface treated; sizing agent-coating in which a sizing agent is coated onto the fiber; drying in which the carbon fiber with the sizing agent coated thereon is dried; and winding in which the fiber is wound into a package.

During the above steps such as the oxidation step and the carbonization step, the fiber is thermally treated in the oven/furnace at a high temperature to impart desired physical properties to the fiber in each step. As a result of the treatment, substances contained in the precursor fiber such as impurities may decompose and volatilize in the oven/furnace at a high temperature. The resultant matter may contaminate the oven/furnace or adhere to the fiber surface, resulting in degradation of quality and grade of the fiber. To prevent these problems, gas in the oven/furnace is discharged and fresh gas in an amount equal to the discharged amount is replenished, and the discharged gas is subjected to combustion processing.

To further decompose the discharged gas (exhaust gas) containing impurities that have decomposed and volatilized in the oven/furnace at a high temperature, it is necessary to heat the exhaust gas at approximately 500 to 1300° C. To carry out this combustion processing, an exhaust gas combustion apparatus equipped with a direct fired system is often employed, in which system a flame is applied directly to the exhaust gas in a chamber partitioned by, for example, bricks, to thereby decompose the exhaust gas. A configuration of a combustion apparatus equipped with a direct fired system effective for decomposing such gas is proposed (JP 2006-308275 A). More specifically, JP 2006-308275 A discloses that an exhaust gas is treated in a substantially cylindrical combustion processing oven comprising a plurality of ducts for introducing the exhaust gas, at least one of the ducts being adapted to cause the introduced gas to form a rotational flow in a treatment chamber, and that it is preferable that certain parameters, for example, a heating value of a gas forming the rotational flow and a heating value of a gas forming central flow satisfy a certain relationship.

Moreover, there is a need to recover waste heat from a high temperature gas following combustion processing by, for example, a heat exchanger. Flows of discharged gas and supplied gas for each high temperature ovens/furnaces in carbon fiber production are proposed (JP 2009-174078 A).

However, in the apparatus described in JP 2006-308275 A, through which position the gas is introduced into the apparatus significantly affects the combustion stability and, therefore, if the position is not thoroughly considered, flame in the combustion apparatus would become unstable in extreme cases, leading to unstable process condition, which is problematic. In addition, the processed gas exiting from the exhaust gas combustion apparatus is still hot when released into the atmosphere. Thus, still there is a possibility that unnecessarily wasted heat can be recovered.

According to the method described in JP 2009-174078 A, the waste heat recovery to recycle the recovered heat to a carbon fiber production step achieves a certain effectiveness. Nevertheless, the respective gases discharged from the oxidation oven and the carbonization furnace are not distinguished from each other and are altogether sent to an exhaust gas combustion apparatus. A concept by which the position through which the exhaust gas is introduced into the exhaust gas combustion apparatus is altered depending on the heating value of the exhaust gas has not been disclosed therein.

It could therefore be helpful to provide a method of producing a carbon fiber in an economical manner by use of an exhaust gas combustion apparatus with lower energy loss.

SUMMARY

We thus provide:

(1) A carbon fiber production method comprising:
a carbon fiber production step which comprises at least the steps of:
oxidation in which a precursor fiber is subjected to an oxidation treatment by circulating hot air to obtain an oxidated fiber;
carbonization in which the oxidated fiber is subjected to a carbonization treatment to obtain a carbon fiber;
sizing agent-coating in which a sizing agent is coated onto the carbon fiber; and drying in which drying is performed following the sizing agent-coating step;
and an exhaust gas processing step in which an exhaust gas obtained at least from the oxidation step, the carbonization step, and the drying step is subjected to combustion processing in an exhaust gas combustion apparatus;
wherein said exhaust gas processing step comprises the steps of: heat exchanging in which a processed exhaust gas discharged from the exhaust gas combustion apparatus is allowed to exchange heat with an untreated external air to obtain a heated external air; external air mixing in which the heated external air is admixed with an untreated external air to obtain a mixed external air; and mixed external air supplying in which the mixed external air is supplied to, among the steps in the carbon fiber production step, at least one step that uses heated gas; and
wherein, among the exhaust gases, a high heating value exhaust gas having a heating value of 250 kcal/Nm$^3$ is supplied to the inlet side of the exhaust gas combustion apparatus and a low heating value exhaust gas having a heating value lower than 150 kcal/Nm$^3$ is supplied to the outlet side of the exhaust gas combustion apparatus, respectively,
or alternatively, (2) A carbon fiber production method comprising:

a carbon fiber production step which comprises at least the steps of:

oxidation in which a precursor fiber is subjected to an oxidation treatment by circulating hot air to obtain an oxidated fiber; and carbonization in which the oxidated fiber is subjected to a carbonization treatment to obtain a carbon fiber;

and an exhaust gas combustion step in which an exhaust gas obtained at least from the oxidation step and the carbonization step is subjected to a combustion processing in an exhaust gas combustion apparatus;

wherein said exhaust gas combustion step comprises the steps of: heat exchanging in which a processed exhaust gas discharged from the exhaust gas combustion apparatus is allowed to exchange heat with an untreated external air to obtain a heated external air; external air mixing in which the heated external air is admixed with an untreated external air to obtain a mixed external air; and mixed external air supplying in which the mixed external air is supplied to, among the steps in the carbon fiber production step, at least one step that uses heated gas; and wherein, among the exhaust gases, a high heating value exhaust gas having a heating value of 250 kcal/Nm$^3$ or higher is supplied to the inlet side of the exhaust gas combustion apparatus and a low heating value exhaust gas having a heating value lower than 150 kcal/Nm$^3$ is supplied to the outlet side of the exhaust gas combustion apparatus, respectively.

The heating value of the exhaust gas is determined as follows.

Determination Method for Heating Value of Exhaust Gas

Figure 2:
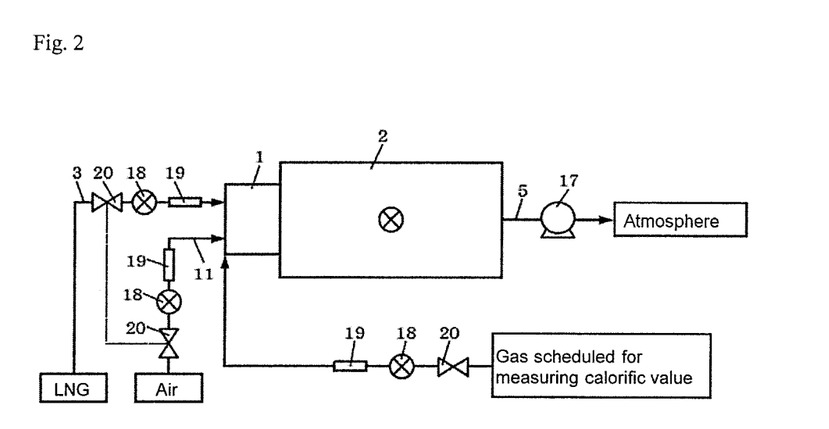
FIG. 2 is a schematic plan view of an exemplary heating value determining apparatus for exhaust gas.

As shown in FIG. 2, supply sources of the gas to be determined for its heating value, air at a temperature of 20° C., and liquefied natural gas (LNG) are respectively connected to a heating value determining apparatus via conduits, and an induction blower is installed at the outlet side of the exhaust gas combustion apparatus. These gases are introduced into the exhaust gas combustion apparatus by aspirating a gas in the apparatus by the blower. LNG and the air that assists the combustion are supplied to the apparatus. The exhaust gas is supplied such that the coefficient of variation of the flow rate does not exceed 20%. These gases are combusted using a burner. The flow rate of LNG is adjusted such that the temperature of the gas generated by the exhaust gas processing is 800° C. The gas in the exhaust gas combustion apparatus is aspirated by the induction blower such that the internal pressure is kept at −4.0 kPa. The processed gas that has undergone the combustion is released into the atmosphere.

A K-type thermocouple, a differential pressure flowmeter (orifice-plate type), and a manual operation valve are attached to each conduit for transferring the processed gas, air, and LNG, and these conduits and the exhaust gas combustion apparatus are thermally insulated to prevent heat loss. Under these conditions, the heating value of the exhaust gas is continuously monitored. The heating value is calculated using the following equation.

Owing to the above arrangement, the flow rate of LNG is stable during the monitoring, thus the flame condition during combustion is ensured to be stable.

In the equation, the value represented in Nm$^3$ is a volume (m$^3$) at 0° C. and 1 atm.

$$C_1 = Q_1 \times 1.293(\rho_1) \times 0.247(Cp_1) \times (800 - 20(T_1))$$

$$\therefore C_1 = Q_1 \times 242$$

$$C_2 = Q_2 \times \rho_2 \times Cp_2 \times (800 - T_2)$$

$$Q_3 = \frac{(C_1 + C_2)}{10702(Ho_3)}$$

$$Q_4 = Q_3 - Q_5$$

$$C_3 = Q_4 \times 10702(Ho_3)$$

$$C_4 = C_3 - Q_1 \times 1.293(\rho_1) \times 0.247(Cp_1) \times 20(T_1)$$

$$H_1 = \frac{C_4}{Q_2}$$

wherein, definitions of each constant and variable are as follows:

$\rho_1$: density of air 1.293 [kg/Nm$^3$]
$\rho_2$: density of exhaust gas to be determined for its heating value [kg/Nm$^3$]
$Cp_1$: average specific heat under constant pressure of air at 20 to 800° C. 0.247 [kcal/(kg·° C.)]
$Cp_2$: average specific heat under constant pressure at $T_2$ to 800° C. of exhaust gas to be determined for its heating value [kcal/(kg·° C.)]
$T_1$: air temperature 20[° C.]
$T_2$ average temperature of exhaust gas to be determined for its heating value [° C.]
$H_1$: heating value of exhaust gas at 800° C. [kcal/Nm$^3$]
$Ho_3$: high level heating value of LNG 10702 [kcal/Nm$^3$]
$Q_1$: flow rate of air [Nm$^3$/h]
$Q_2$ average flow rate of exhaust gas to be determined for its heating value [Nm$^3$/h]
$Q_3$ theoretical flow rate of LNG to heat air and exhaust gas up to 800° C. [Nm$^3$/h]
$Q_4$ difference between required flow rate of LNG and average actual flow rate of LNG [Nm$^3$/h]
$Q_5$ average actual flow rate of LNG [Nm$^3$/h]
$C_1$: heat quantity to heat air up to 800° C. [kcal/h]
$C_2$ heat quantity to heat exhaust gas up to 800° C. [kcal/h]
$C_3$ heat quantity sum of exhaust gas and air at 800° C. [kcal/h]
$C_4$ heat quantity of exhaust gas at 800° C. [kcal/h].

According to the carbon fiber production method, carbon fiber can be produced in an economical manner by effectively utilizing the energy of the processed gas generated by the exhaust gas combustion while minimizing the fuel necessary for the processing of the exhaust gas.

REFERENCE SIGNS LIST 1 inlet side of exhaust gas combustion apparatus
2 outlet side of exhaust gas combustion apparatus
3 fuel supply path
4 heat exchanger
5 processed gas flow path
6 carbon fiber production step 7 supply path for high heating value exhaust gas
8 supply path for low heating value exhaust gas
9 supply path for combustion-assisting exhaust gas
10 blower for external air for combustion
11 flow path for combustion-assisting gas
12 supply path for heated external air
13 supply path for untreated external air
14 supply path for mixed external air
15 supply path for untreated external air connected to heat exchanger
16 blower
17 induction blower
18 temperature sensing means
19 flow rate sensing means
20 flow rate adjusting means
21 flow path switching valve

DETAILED DESCRIPTION

The carbon fiber production method comprises at least a carbon fiber production step and an exhaust gas processing step.

An exhaust gas processing step according to an example will be described referring to FIG. 1.

The exhaust gas processing step may further be subdivided into the steps of: exhaust gas combustion, heat exchange, and mixed external air supply. The exhaust gas combustion step is a step in which an exhaust gas is processed and recycled by an exhaust gas processing apparatus comprising an exhaust gas combustion apparatus (collective term of 1 and 2), a heat exchanger 4, and supply paths for external air (12, 13, 14).

In the exhaust gas combustion step, exhaust gas flow paths (7, 8) are provided for transferring the exhaust gas from the carbon fiber production step to the exhaust gas combustion apparatus (1, 2) where a direct fired system for combustion processing of the exhaust gas is equipped. Furthermore, a fuel supply path 3 for supplying a fuel used for the exhaust gas combustion and a gas flow path 11 for supplying a gas that assists the combustion ("combustion-assisting gas") are also provided.

In the heat exchange step, the heat exchanger 4 allows heat exchange of a processed gas sent from the exhaust gas combustion apparatus (1, 2) with an external air. The processed gas that has processed in the exhaust gas combustion apparatus (1, 2) is sent via a processed gas flow path 5 to the heat exchanger 4. An external air is supplied via a flow path 15 to the heat exchanger 4 where the external air is subjected to heat exchange, and the resultant heated external air is discharged from the heat exchanger 4 via a heated external air supply path 12.

The mixed external air supply step comprises an untreated external air supply path 13 through which an external air that has not passed through the heat exchanger 4 ("untreated external air") flows, and a mixed external air supply path 14 through which a mixed external air formed by admixing the untreated external air with the heated external air sent via the heated external air supply path 12 flows.

Carbon Fiber Production Step

The carbon fiber production step comprises, for example, the following steps, among which steps the oxidation step and the carbonization step are necessary.

Oxidation Step

In the oxidation step, PAN fiber as a precursor fiber is oxidated in an oxidizing gas such as air at a temperature of 200 to 300° C., to thereby yield an oxidated fiber.

Carbonization Step

In the carbonization step, the oxidated fiber is carbonized in an inert atmosphere at a temperature of 300 to 2000° C., to thereby yield a carbon fiber.

Surface Treatment Step

The carbon fiber obtained in the carbonization step is further surface treated to impart adhesiveness to a resin to the fiber, as required. The method of the surface treatment is not particularly limited as long as it enables to impart adhesiveness to a resin to the fiber. Examples of such a method include a dry method such as ozone oxidation or a wet method such as electrochemical treatment of fiber surface in an electrolyte solution.

Sizing Agent Coating Step

The surface-treated carbon fiber is further coated with a sizing agent, as required. The sizing agent acts to enhance ease of handling of the carbon fiber and to enhance affinity to a resin.

The type of the sizing agent is not particularly limited as long as it imparts desired properties to the fiber. Examples of the sizing agent include a sizing agent based on epoxy resin, polyether resin, epoxy-modified urethane resin, or polyester resin.

The carbon fiber generally has a filament number of 1000 to 70000, and preferably has an equivalent circle diameter of single filament of 4 μm to 10 μm. In particular, a carbon fiber having a filament number of 3000 to 50000 and an equivalent circle diameter of single filament of 4.5 μm to 8.5 μm is further preferred from the viewpoint of the producibility and properties of the carbon fiber. In addition, a surfactant applied to the precursor fiber for the purpose of enhancing the strength of the carbon fiber produced therefrom preferably has a high heat resistance. The surfactant is not particularly limited, but, as an example, a surfactant that contains an amino-modified silicone-based compound is preferably used for the reason that a thermal decomposition product of such a silicone compound can be processed effectively, and that such a surfactant improves properties such as tensile strength of the resultant carbon fiber and has an effect to impart stability to the carbon fiber. The silicone oil agent preferably has a residual ratio after heating "r" of 20% or higher, more preferably 40% or higher. The term "residual ratio after heating" refers to a ratio of residues resulted from heating a starting silicone material in air at 240° C. for 60 minutes, followed by heating in nitrogen at 450° C. for 30 seconds. More specifically, approximately 1 g of a sample of the oil agent (in a form of emulsion or solution if the oil agent is in an emulsion or in a solution form, respectively) is taken in an aluminum container with a diameter of about 60 mm and a height of about 20 mm, and the sample is dried in air at 105° C. for 5 hours. The dried sample is subjected to TG (Thermobalance) in the following manner: the dried sample having a weight of 15 to 20 mg is heated to 240° C. at a heating rate of 10° C./min in an air atmosphere with an air flow rate of 30 ml/min; and when reached to 240° C., held the temperature for 60 minutes; and then, the atmosphere is replaced to nitrogen and held the nitrogen atmosphere for 5 minutes; and then, heated to 450° C. at a heating rate of 10° C./min in the nitrogen atmosphere with a nitrogen flow rate of 30 ml/min; and when reached to 450° C., held the temperature for 30 seconds. The resultant residue is weighed, and the percentage of the weight of the residue with respect to the weight of the starting sample on a dry basis is calculated, and is referred to as the residual ratio after heating "r".

Examples of such an oil agent include an oil agent comprising, as a main component, an amino-modified dimethylsilicone having a functional group of —NH—CH$_2$—

$CH_2$—$NH_2$ on the side chain, a modified silicone such as an epoxy-modified silicone, and a disperse media.

Drying Step

Typically, the sizing agent is coated together with a solvent such as water and with a dispersing agent, and thereafter the solvent and the disperse media are removed by drying.

Exhaust Gas Processing Step

The exhaust gas processing step comprises the steps of: exhaust gas combustion, heat exchange, and mixed external air supply. Examples of the exhaust gas generated in the carbon fiber production step 6 include: a gas used for heating fibers, if heating is performed prior to oxidation, that comprises air or nitrogen as a main component and possibly comprises decomposition product of the fibers; an exhaust gas discharged from the oxidation oven; an exhaust gas discharged from each of the carbonization furnace provided in one or more carbonization stage; an exhaust gas generated by surface treatment; and an exhaust gas generated by drying fibers that has undergone the surface treatment and/or the sizing treatment.

The exhaust gas combustion step is a step to combust the exhaust gas discharged from the carbon fiber production step 6 for the purpose of decomposing compounds contained in the exhaust gas such as a cyanide compound, ammonia, carbon monoxide, and a tar component. Among the above-described exhaust gases, the exhaust gases to be combusted in this step are mainly the one having a high heating value and the one that is preferably decomposed prior to being released into the atmosphere. Additionally, the exhaust gases that are necessarily processed in the exhaust gas combustion step are the one discharged from the oxidation step, the one discharged from the carbonization step, and the one discharged from the drying step of a sizing agent-coated fiber. The exhaust gas combustion apparatus is adapted to admix a fuel supplied through the fuel supply path 3 for combusting the exhaust gas with a gas such as air supplied by a blower 10, and to combust the resultant admixture.

The exhaust gas combustion apparatus is characterized by comprising the fuel supply path 3 and an exhaust gas supply path 7 for supplying a high heating value exhaust gas having a heating value of 250 kcal/$Nm^3$ or higher, both of which paths are connected to the inlet side thereof, and an exhaust gas supply path 8 for supplying a low heating value exhaust gas having a heating value lower than 150 kcal/$Nm^3$, which path is connected to the outlet side thereof.

Among the exhaust gases discharged from the carbon fiber production step, a high heating value exhaust gas having a heating value of 250 kcal/$Nm^3$ or higher is supplied to the inlet side 1 of the exhaust gas combustion apparatus. This exhaust gas is combusted using a fuel and a combustion-assisting gas, and a flame is generated by utilizing the heating value released by combusting the exhaust gas. Separate from this, a low heating value exhaust gas having a heating value lower than 150 kcal/$Nm^3$ is supplied through the exhaust gas supply path 8 that is connected to the exhaust gas combustion apparatus at a position closer to the outlet side than the inlet side. An exhaust gas having a heating value of 150 kcal/$Nm^3$ to lower than 250 kcal/$Nm^3$ may be supplied from either side because it does not make much difference from the viewpoint of energy. Therefore, the position from which such an exhaust gas is supplied can be determined in consideration of runnability and process stability.

The heating value does not vary significantly if a particular production step and the condition thereof is fixed. Therefore, respective heating values of the exhaust gases discharged from different steps are previously determined, and the respective exhaust gases are supplied to the inlet side or the outlet side in accordance with the heating value thereof.

Figure 1:
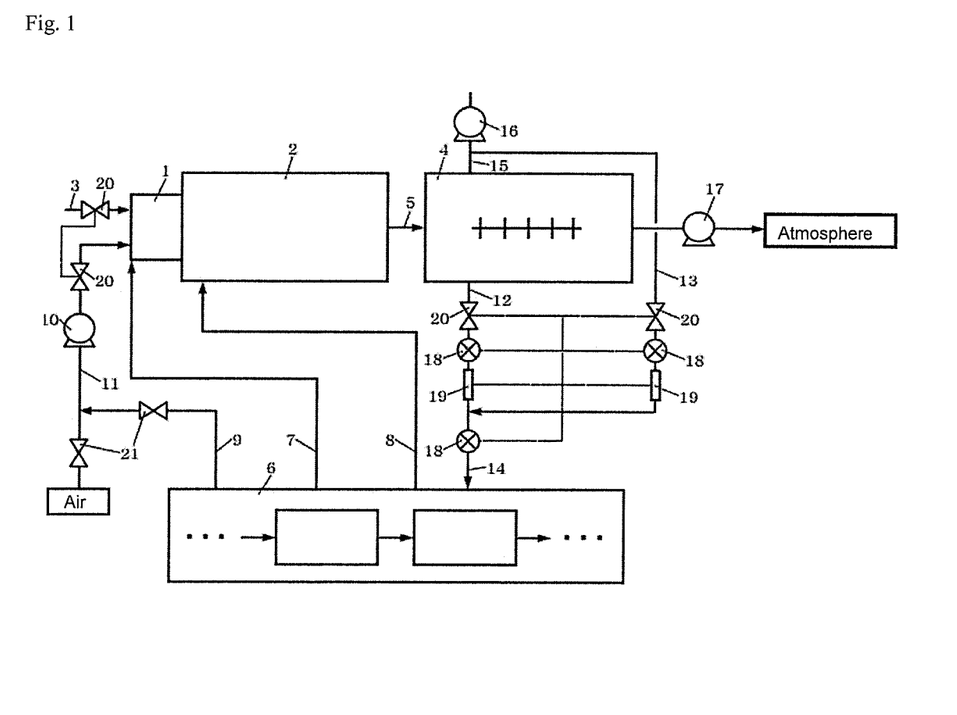
FIG. 1 is a schematic plan view of an exemplary airflow.

Referring to FIG. 1, although the cross sectional area of the side of the exhaust gas combustion apparatus (1, 2) to which the outlet side supply path is connected seems larger than that of the side of the exhaust gas combustion apparatus (1, 2) to which the inlet side supply path is connected, the cross sectional area of the former may be the same as or smaller than the latter.

The flow rate for supplying the fuel is preferably controlled such that the temperature in the combustion apparatus is controlled for decomposition of impurities. On the other hand, the flow rates of the combustion-assisting gas and the fuel are preferably controlled such that the ratio between them is constant. The ratio is previously determined by carrying out studies such as experiments to achieve an optimum combustion efficiency. As the combustion-assisting gas, untreated external air may be used. It is also preferable to use, as the combustion-assisting gas, a part of an exhaust gas that predominantly consists of air. In this example, such an exhaust gas is supplied in an amount of ±10% with respect to the amount of air corresponding to the theoretical air fuel ratio that is calculated from the fuel consumption. The remainder of the exhaust gas is supplied to the exhaust gas combustion apparatus (1, 2). When the heating value of the exhaust gas is 250 kcal/$Nm^3$ or higher, it should be supplied to the exhaust gas combustion apparatus via the inlet side 1, whereas when the heating value of the exhaust gas is lower than 150 kcal/$Nm^3$, it should be supplied to the exhaust gas combustion apparatus via the outlet side 2.

The term "exhaust gas that predominantly consists of air" refers to an exhaust gas composed of 95% or more air and a remainder comprising a flammable gas and a gaseous decomposed product.

Examples of the exhaust gas that predominantly consists of air include: an exhaust gas generated by the heat treatment of the unwound precursor fiber in air; an exhaust gas discharged from the oxidation step; an exhaust gas discharged from the surface treatment step; and an exhaust gas discharged from the drying step of the sizing agent-coated carbon fiber. Type of the blower 10 is not particularly limited, and is suitably selected in consideration of conditions such as place to be installed, and a temperature and a flow rate of the exhaust gas. The intake port for the combustion-assisting gas may be positioned on the way of the exhaust gas supply path (7, 8), as per the requirement such as the specification of the exhaust gas combustion apparatus (1, 2).

The term "inlet side 1 of the exhaust gas combustion apparatus" refers to the area on the end face of the inlet side and the zone within 100 cm away from the end face of the inlet side along the longitudinal direction of the exhaust gas combustion apparatus (1, 2). The term "outlet side 2 of the exhaust gas combustion apparatus" refers to the zone 150 cm or further away from the end face of the inlet side along the longitudinal direction of the exhaust gas combustion apparatus (1, 2). By introducing a high heating value exhaust gas into the zone within 100 cm away from the end face of the inlet side of the exhaust gas combustion apparatus (1, 2), the high heating value exhaust gas can be introduced into the zone closer to the bottom of the flame, leading to fuel reduction to generate the flame. In addition, by introducing a low heating value exhaust gas 150 cm or further away from the end face of the inlet side along the longitudinal direction of the exhaust gas combustion apparatus (1, 2), the low heating value exhaust gas can be introduced into the zone where the generated flame is sufficiently expanded, thereby ensuring a prolonged contact time with the flame, resulting in increased decomposition efficiency.

The inlet side 1 and the outlet side 2 of the exhaust gas combustion apparatus are not necessarily divided physically from each other by, for example, altering the cross sectional area or attaching some parts; they are merely defined by the distance from the end face of the exhaust gas combustion apparatus. Within the zone of the inlet side, the supply port for the high heating value exhaust gas on the inlet side is preferably placed within 50 cm away from the end face of the inlet side 1 along the longitudinal direction of the exhaust gas combustion apparatus. On the other hand, the supply port for the low heating value exhaust gas on the outlet side should be placed 150 cm or further away from the end face of the exhaust gas combustion apparatus (1, 2); but it is preferably placed 150 cm or further, more preferably 200 cm or further away from the supply port for high heating value exhaust gas that is the closest to the inlet side. However, if the distance between the supply port for high heating value exhaust gas on the inlet side and the supply port for low heating value exhaust gas on the outlet side is over 650 cm, the increase of the efficiency is not commensurate with the distance, and besides, the size of the apparatus enlarges, therefore the distance is preferably 650 cm or less.

Alternatively, a plurality of the exhaust gas supply ports may be provided in each of the inlet side 1 and/or outlet side 2 of the exhaust gas combustion apparatus. When a plurality of the exhaust gas supply ports for high heating value exhaust gas are provided within the inlet side 1, all of the supply ports for high heating value exhaust gas are preferably placed on the end face or within the zone 50 cm away from the end face of the exhaust gas combustion apparatus (1, 2). On the other hand, when a plurality of exhaust gas supply ports for low heating value exhaust gas are provided within the outlet side 2, all of the supply ports for low heating value exhaust gas are preferably placed 150 cm or further away from the supply port for high heating value exhaust gas that is the closest to the outlet side.

It is also preferable to employ an exhaust gas combustion apparatus (1, 2) in cylindrical form and to introduce exhaust gas such that at least a part of the exhaust gas generates a rotational flow. Exhaust gas is divided in accordance with the heating value thereof, and each of the divided exhaust gas is introduced via the respective appropriate position. As a result, fuel consumption for combustion can be reduced and the combustion state can be stabilized.

As the fuel supplied through the fuel supply path 3, gaseous fuels such as LNG and LPG, or liquified fuels such as kerosene and light oil may be used.

Heat Exchange Step

The processed gas that has undergone the decomposition processing is discharged from the exhaust gas combustion apparatus (1, 2), and is transferred through the processed gas flow path 5 to heat exchanger 4, where the processed gas is utilized to heat external air by heat exchange.

The processed gas flow path 5 passes through the heat exchanger 4. To the heat exchanger 4, an untreated external air supply path 15 for transferring external air from the blower 16 to the heat exchanger 4 and a heated external air supply path 12 for transferring heated external air discharged from the heat exchanger 4 are further connected. The heat exchange step is configured to allow heat exchange between the external air transferred through the untreated external air supply path 15 and the processed gas transferred through the processed gas flow path 5, and to send the resultant gas to the heated external air supply path 12.

Thereafter, the processed gas discharged from the heat exchanger 4 flows through the processed gas flow path 5, and then the gas may be released directly to the outside of the system. If necessary, prior to being released to the outside of the system, particulate matter such as silicon compound contained in the processed gas may be removed by a filter (not shown) disposed in the processed gas flow path 5.

It is known that particulate matter such as silicon compound deposits in the heat exchanger 4 when used in the carbon fiber production step, leading to gradual decrease in heat exchange efficiency. To prevent the decrease in heat exchange efficiency, it is preferable to provide a soot blower in heat exchanger 4 to blow off the particulate matter deposited therein by jetting compressed air so that the heating of the hot air can be carried out for a prolonged period of time without any trouble.

Examples of the heat exchanger 4 include a tubular type heat exchanger, a shell and tube heat exchanger, and a plate type heat exchanger.

Mixed External Air Supply Step

External air taken by the blower 16 flows through the untreated external air supply path 15, and a part of the external air flowing through the untreated external air supply path 15 is diverged from the untreated external air supply path 15 and is delivered to the heat exchanger 4. The external air delivered to the heat exchanger 4 is, as described above, allowed to heat exchange with the processed gas delivered through the processed gas flow path 5, to thereby yield a heated external air.

In the mixed external air supply step, the untreated external air supply path 13 that does not pass through the heat exchanger is merged into the heated external air supply path 12, and the resultant mixed external air is supplied through a mixed external air supply path 14 to the carbon fiber production step. The mixed external air is supplied to the step that requires the heated external air such as oxidation step and drying step.

The mixed external air supply path 14 preferably comprises a temperature sensing means for detecting the temperature of the mixed external air flowing through the mixed external air supply path 14 and a temperature adjusting means for adjusting the temperature of the mixed external air flowing through the mixed external air supply path 14. The temperature adjusting means preferably comprises the heated external air supply path 12 with an automatic valve and the untreated external air supply path 13 with an automatic valve.

Through the cooperation of the heat exchanger 4, the heated external air supply path 12, the untreated external air supply path 13, and the mixed external air supply path 14, it becomes possible to collect, to the greatest extent possible, the heat generated in the above described exhaust gas combustion apparatus.

The term "untreated external air" refers to air present outside of the carbon fiber production step 6. The untreated external air is taken into the carbon fiber production step 6 from the outside thereof and directly used without any treatment especially heating or cooling.

Next, there will be described the adjusting means for temperature and flow rate of external air that flows through the mixed external air supply path 14 and the temperature sensing means 18 for detecting temperature of the mixed external air.

The temperature sensing means 18 and a flow rate sensing means 19 provided in the heated external air supply path 12 and in the untreated external air supply path 13 are electrically connected to control means. The control means is further electrically connected to each of flow rate adjusting means 20 provided in the supply paths. The control means calculates the heating value of the external air flowing through each of the supply paths (12, 13) based on a temperature signal detected by the temperature sensing means 18 and on a flow rate signal detected by the flow rate sensing means 19.

It is preferred that the configuration be such that: the flow rate and the temperature of the external air flowing through the mixed external air supply path 14 is previously determined and the heating value thereof is previously calculated, and then a control signal is sent to each of the flow rate adjusting means 20 provided in the external air supply paths (12, 13) so that the aperture of the automatic valve of the flow rate adjusting means 20 is controlled.

To adjust the temperature of the mixed external air, it is also possible to send a flow rate control signal to each of the automatic valve for heated external air and untreated external air based on the detected temperature of the mixed external air.

The automatic valve electrically connected to the control means is preferably configured to control, based on a flow rate control signal sent from the control means, each flow rate of the external air flowing through the external air supply paths (12, 13) such that the resultant mixed external air flowing through the mixed external air supply path has a desired heating value and a flow rate.

As described above, by supplying the mixed external air, of which temperature and flow rate are adjusted, to the carbon fiber production step 6, temperature unevenness and flow rate unevenness of the hot air used in the carbon fiber production can be reduced. As a result, stable carbon fiber production may be attained.

Examples of the temperature sensing means 18 include a thermocouple and a resistance temperature detector. Examples of the flow rate sensing means 19 include anemometers of various types, a pitot tube, a differential pressure flowmeter, an ultrasonic flowmeter, and a vortex flowmeter.

The control means may consist of commercially available devices or of dedicated hardware and software.

If necessary, peripheral equipment such as an input device and a display device (not shown) may be connected to the control means. Examples of the input device include a display touch panel, a switch panel, and a keyboard. Examples of the display device include CRT and a liquid crystal display device.

As shown in the example illustrated in FIG. 1, the flow rate and the temperature of the mixed external air are adjusted, and then the mixed external air is supplied to a part of the carbon fiber production step 6 where such an external air is required. More specifically, the flow rate and the temperature of each of the external air flowing through the heated external air supply path 12 and untreated external air supply path 13 are detected by the flow rate sensing means 19 and the temperature sensing means 18, and, based on the flow rate control signal sent from the control means, the automatic valves are controlled to adjust the heating value of the mixed external air. The step to which the mixed external air is supplied is not particularly limited as long as the step uses hot air. Examples of such a step include the pretreatment step of the precursor fiber, the oxidation step, and the drying step after surface treatment or after sizing agent-coating. The specific step to which the mixed external air is supplied may be determined by considering the flow rate and the temperature. Preferably, the mixed external air is supplied to the oxidation step, which requires especially high flow rate.

In this example, temperature adjustment is performed by admixing the unheated external air with the heated external air. In other words, this temperature adjustment results in decreasing the temperature of the heated external air. However, this disclosure is not limited thereto. If the temperature of the heated external air is lower than a desired temperature, a heater (not shown) may be provided in the heated external air supply path 12 and/or the untreated external air path 13. The heater may be controlled based on a temperature detection signal detected by the temperature sensing means to raise the temperature of the heated external air to the desired level. Examples of the heater include an electric heater that can be wrapped around the heated external air supply path and the untreated external air supply path 13.

If the temperature is to be lowered, it is possible to concurrently use a damper that is installed in the heated external air supply path 12 and/or mixed external air supply path 14 to release the heated external air and/or the mixed external air to the atmosphere.

As described above, by adjusting the heating value of the mixed external air, a more suitable mixed external air may be supplied to the carbon fiber production step 6.

In the carbon fiber production method, an exhaust gas is supplied to an exhaust gas combustion apparatus through different positions in accordance with the heating value of the exhaust gas. As a result, all of the exhaust gas generated in the different steps in the carbon fiber production can be processed in the same exhaust gas processing apparatus, and fuel consumption can also be minimized, thereby achieving cost reduction. In addition, since the flow rate and the temperature of the mixed external air can be adjusted prior to being supplied to the carbon fiber production step, the temperature unevenness of hot air is less likely to occur. Consequently, the temperature can be stably controlled, thereby achieving a carbon fiber with a consistent quality.

EXAMPLES

Hereinafter, our methods will further be described in more detail in reference to Examples.

Determination Method for Heating Value of Exhaust Gas

As shown in FIG. 2, supply sources for the exhaust gas to be determined for its heating value, air at a temperature of 20° C., and LNG are respectively connected to a heating value determining apparatus via conduits, and an induction blower 17 is installed at the outlet side of the exhaust gas combustion apparatus. These gases are introduced into the exhaust gas combustion apparatus by aspirating a gas in the apparatus by the blower. LNG and the air that assists the combustion are supplied to the apparatus. The exhaust gas is supplied such that the coefficient of variation of the flow rate does not exceed 20%. These gases are combusted using a burner. The flow rate of LNG is adjusted such that the temperature of the gas generated by the exhaust gas processing is 800° C. The gas in the exhaust gas combustion apparatus is aspirated by the induction blower such that the internal pressure is kept at −4.0 kPa. The processed gas that has undergone the combustion is released into the atmosphere.

A K-type thermocouple, a differential pressure flowmeter (orifice-plate type), and a manual operation valve are attached to each conduit for transferring the processed gas, air, and LNG, and these conduits and the exhaust gas combustion apparatus are thermally insulated to prevent heat loss. Under these conditions, the heating value of the exhaust gas is continuously monitored. The heating value is calculated using the following equation.

In the following equation, the value represented in $Nm^3$ is a volume ($m^3$) at 0° C. and 1 atm.

$$C_1 = Q_1 \times 1.293(\rho_1) \times 0.247(Cp_1) \times (800 - 20(T_1))$$

$$\therefore C_1 = Q_1 \times 242$$

$$C_2 = Q_2 \times \rho_2 \times Cp_2 \times (800 - T_2)$$

$$Q_3 = \frac{(C_1 + C_2)}{10702(Ho_3)}$$

$$Q_4 = Q_3 - Q_5$$

$$C_3 = Q_4 \times 10702(Ho_3)$$

$$C_4 = C_3 - Q_1 \times 1.293(\rho_1) \times 0.247(Cp_1) \times 20(T_1)$$

$$H_1 = \frac{C_4}{Q_2}$$

wherein, definitions of each constant and variable are as follows:
$\rho_1$: density of air 1.293 [$kg/Nm^3$]
$\rho_2$: density of exhaust gas to be determined for its heating value [$kg/Nm^3$]
$Cp_1$: average specific heat under constant pressure of air at 20 to 800° C. 0.247 [$kcal/(kg \cdot °C.)$]
$Cp_2$: average specific heat under constant pressure at $T_2$ to 800° C. of exhaust gas to be determined for its heating value [$kcal/(kg \cdot °C.)$]
$T_1$: air temperature 20[° C.]
$T_2$: average temperature of exhaust gas to be determined for its heating value [° C.]
$H_1$: heating value of exhaust gas at 800° C. [$kcal/Nm^3$]
$Ho_3$: high level heating value of LNG 10702 [$kcal/Nm^3$]
$Q_1$: flow rate of air [$Nm^3/h$]
$Q_2$: average flow rate of exhaust gas to be determined for its heating value [$Nm^3/h$]
$Q_3$: theoretical flow rate of LNG to heat air and exhaust gas up to 800° C. [$Nm^3/h$]
$Q_4$: difference between required flow rate of LNG and average actual flow rate of LNG [$Nm^3/h$]
$Q_5$: average actual flow rate of LNG [$Nm^3/h$]
$C_1$: heat quantity to heat air up to 800° C. [$kcal/h$]
$C_2$: heat quantity to heat exhaust gas up to 800° C. [$kcal/h$]
$C_3$: heat quantity sum of exhaust gas and air at 800° C. [$kcal/h$]
$C_4$: heat quantity of exhaust gas at 800° C. [$kcal/h$].

Calculation of Standard Deviation of Mixed External Air Temperature

A K-type thermocouple is attached to the mixed external air supply path, and the installation and the conduits are thermally insulated to prevent heat loss. Under these conditions, temperatures are measured and the measured values are output. The measurements are carried out for 2 days, and the standard deviation is calculated from the collected output data by the following equation.

$$S = \sqrt{\frac{1}{n-1} \sum_{i=1}^{n} (T_i - \overline{T})^2}$$

wherein, definitions of each constant and variable are as follows:
S: standard variation [° C.]
n: numbers of data
$T_i$: individual value of each data [° C.]
$\overline{T}$: average value of entire data [° C.].

Example 1

PAN precursor fiber having a filament number of 24000 and a single fiber fineness of 1.1 dtex onto which a silicon-based oil agent having the above-described residual ratio after heating "r" of 45% was applied in an amount of 0.5% was used. The fibers were pulled from a creel, and were subjected to oxidation, primary carbonization, and secondary carbonization, followed by surface treatment. Subsequently, an aqueous sizing agent was coated thereon, followed by drying, and the obtained fibers are wound into a package.

Air was used as the combustion-assisting gas. An inlet side supply port was provided at an end face, i.e., 0 cm away from the end face, of an exhaust gas combustion apparatus, and a high heating value exhaust gas having a heating value of 478 $kcal/Nm^3$ was supplied through the inlet side supply port. An outlet side port was provided at the position 200 cm away from the inlet side supply port, and a low heating value exhaust gas having a heating value of 77 $kcal/Nm^3$ was supplied through the outlet side supply port. LNG consumption in the exhaust gas combustion apparatus of Example 1 is shown in Table 1. As regards to the following examples, reduction rates of LNG consumption with respect to Comparative Example 1 are also shown in Table 1.

Example 2

Exhaust gas processing as described in Example 1 was repeated except that the heating value of the exhaust gas supplied to the exhaust gas combustion apparatus through the inlet side supply port was 332 $kcal/Nm^3$. LNG consumption in the exhaust gas combustion apparatus of Example 2 is shown in Table 1.

Example 3

Exhaust gas processing as described in Example 2 was repeated except that the inlet side supply port was placed 100 cm away from the end face of the exhaust gas combustion apparatus, and the outlet side supply port was placed 75 cm away from the inlet side supply port. LNG consumption in the exhaust gas combustion apparatus of Example 3 is shown in Table 1.

Example 4

Exhaust gas processing as described in Example 2 was repeated except that the outlet side supply port was placed 300 cm away from the inlet side supply port. LNG consumption in the exhaust gas combustion apparatus of Example 4 is shown in Table 1.

Example 5

Exhaust gas processing as described in Example 2 was repeated except that a part of the low heating value exhaust gas having a heating value of 77 $kcal/Nm^3$ that was supplied through the outlet side supply port in Example 2 was supplied as the combustion-assisting gas, while the total amount of the exhaust gas to be processed was kept the same as in Example 2. LNG consumption in the exhaust gas combustion apparatus of Example 5 is shown in Table 1.

Example 6

The exhaust gas processing by combustion as described in Example 1 was repeated except that the temperature of the gas obtained by admixing of the heated external air and the untreated external air was adjusted to 165° C. LNG consumption in exhaust gas combustion apparatus of Example 6 and a temperature in the carbonization apparatus and the standard deviation thereof are shown in Table 2.

Example 7

The exhaust gas processing by combustion as described in Example 6 was repeated except that the heating value of the exhaust gas supplied to the exhaust gas combustion apparatus through the inlet side supply port was 332 kcal/Nm$^3$. LNG consumption in exhaust gas combustion apparatus of Example 7 and a temperature in the carbonization apparatus and the standard deviation thereof are shown in Table 2.

Example 8

The exhaust gas processing by combustion as described in Example 6 was repeated except that the each flow rate of the heated external air and the untreated external air was fixed, and the mixed gas was supplied to the carbonization apparatus without adjusting the temperature after admixing. LNG consumption in exhaust gas combustion apparatus of Example 8 and a temperature in the carbonization apparatus and the standard deviation thereof are shown in Table 2.

Example 9

The exhaust gas processing by combustion as described in Example 7 was repeated except that the each flow rate of the heated external air and the untreated external air was fixed, and the mixed gas was supplied to the carbonization apparatus without adjusting the temperature after admixing. LNG consumption in exhaust gas combustion apparatus of Example 9 and a temperature in the carbonization apparatus and the standard deviation thereof are shown in Table 2.

Example 10

PAN precursor fiber having a filament number of 24000 and a single fiber fineness of 1.1 dtex onto which a silicon-based oil agent having the above-described residual ratio after heating "r" of 45% was applied in an amount of 0.5% was used. The fibers were pulled from a creel, and were subjected to oxidation, primary carbonization, and secondary carbonization, and the obtained fibers are wound into a package.

Air was used as the combustion-assisting gas. An inlet side supply port was provided at an end face, i.e., 0 cm away from the end face, of an exhaust gas combustion apparatus, and a high heating value exhaust gas having a heating value of 478 kcal/Nm$^3$ was supplied through the inlet side supply port. An outlet side port was provided at the position 200 cm away from the inlet side supply port, and a low heating value exhaust gas having a heating value of 83 kcal/Nm$^3$ was supplied through the outlet side supply port. LNG consumption in the exhaust gas combustion apparatus of Example 10 is shown in Table 3.

Example 11

Exhaust gas processing as described in Example 10 was repeated except that the heating value of the exhaust gas supplied to the exhaust gas combustion apparatus through the inlet side supply port was 332 kcal/Nm$^3$. LNG consumption in the exhaust gas combustion apparatus of Example 11 is shown in Table 3.

Comparative Example 1

Exhaust gas processing as described in Example 2 was repeated except that the exhaust gases supplied to the exhaust gas combustion apparatus through the inlet side supply port and through the outlet side port were exchanged each other. LNG consumption in the exhaust gas combustion apparatus of Comparative Example 1 is shown in Table 1.

Comparative Example 2

Exhaust gas processing by combustion was performed without dividing the exhaust gas combustion apparatus in two zones, and a low heating value exhaust gas having a heating value of 77 kcal/Nm$^3$ and a high heating value exhaust gas having a heating value of 332 kcal/Nm$^3$ were supplied altogether through a supply port provided at the bottom of the flame. LNG consumption in the exhaust gas combustion apparatus of Comparative Example 2 is shown in Table 1.

Comparative Example 3

Exhaust gas processing as described in Example 11 was repeated except that the exhaust gases supplied to the exhaust gas combustion apparatus through the inlet side supply port and through the outlet side port were exchanged each other. LNG consumption in the exhaust gas combustion apparatus of Comparative Example 3 is shown in Table 3.

Comparative Example 4

Exhaust gas processing by combustion was performed without dividing the exhaust gas combustion apparatus in two zones, and a low heating value exhaust gas having a heating value of 83 kcal/Nm$^3$ and a high heating value exhaust gas having a heating value of 332 kcal/Nm$^3$ were supplied altogether through a supply port provided at the bottom of the flame. LNG consumption in the exhaust gas combustion apparatus of Comparative Example 4 is shown in Table 3.

Evaluation

In all Examples and Comparative Examples, the process was run for 2 days. Significant reduction of fuel consumption could be achieved in Examples 1 to 5, 10, and 11.

In Examples 6 and 7, both the reduction rate of fuel consumption and the temperature of the mixed external air were stable, and the carbon fiber showed good physical properties. On the other hand, in Examples 8 and 9, although the temperature of the mixed external air was slightly unstable and physical properties of the carbon fiber was slightly fluctuated, significant reduction of fuel consumption could be achieved.

TABLE 1

|  | Example 1 | Example 2 | Example 3 | Example 4 | Example 5 | Comparative Example 1 | Comparative Example 2 |
|---|---|---|---|---|---|---|---|
| Supply point of Inlet | 0 cm | 0 cm | 100 cm | 0 cm | 0 cm | 0 cm | 0 cm |
| Supply point of Outlet | 200 cm from Supply point of Inlet | 200 cm from Supply point of Inlet | 75 cm from Supply point of Inlet | 300 cm from Supply point of Inlet | 200 cm from Supply point of Inlet | 200 cm from Supply point of Inlet | Same with Supply point of Inlet |
| Assisting Gas for Combustion | Air | Air | Air | Air | Exhaust Gas to be supplied to Outlet | Air | Air |
| Calorific Value of Exhaust Gas to be supplied to Inlet [kcal/Nm$^3$] | 478 | 332 | 332 | 332 | 332 | 77 | 77, 332 |
| Calorific Value of Exhaust Gas to be supplied to Outlet [kcal/Nm$^3$] | 77 | 77 | 77 | 77 | 77 | 332 | |
| Consumed Amount of LNG [Nm$^3$/h] | 82 | 97 | 109 | 115 | 82 | 132 | 147 |
| Rate of Reduced LNG $^{Note)}$ | 38% | 26% | 17% | 13% | 38% | — | −12% |

Note):
"Rate of Reduced LNG" means Ratio of Rate of Reduced LNG vs. Consumed Amount of LNG of Comparative Example 1.

TABLE 2

|  | Example 6 | Example 7 | Example 8 | Example 9 |
|---|---|---|---|---|
| Supply point of Inlet | 0 cm | | | |
| Supply point of Outlet | 200 cm from Supply point of Inlet | | | |
| Assisting Gas for Combustion | Air | | | |
| Calorific Value of Exhaust Gas to be supplied to Inlet [kcal/Nm$^3$] | 478 | 332 | 478 | 332 |
| Calorific Value of Exhaust Gas to be supplied to Outlet [kcal/Nm$^3$] | 77 | 77 | 77 | 77 |
| Consumed Amount of LNG [Nm$^3$/h] | 82 | 97 | 82 | 97 |
| Rate of Reduced LNG $^{Note)}$ | 38% | 26% | 38% | 26% |
| Control of Mixed Fresh Ar | present | | absent | |
| Average Temperature of Mixed Fresh Air [° C.] | 165 | 165 | 163 | 162 |
| Standard Deviation of Temperature [° C.] | 0.2 | 0.2 | 5.5 | 5.1 |

$^{Note)}$ "Rate of Reduced LNG" means Ratio of Rate of Reduced LNG vs. Consumed Amount of LNG of Comparative Example 1.

TABLE 3

|  | Example 10 | Example 11 | Comparative Example 3 | Comparative Example 4 |
|---|---|---|---|---|
| Supply point of Inlet | 0 cm | 0 cm | 0 cm | 0 cm |
| Supply point of Outlet | 200 cm from Supply point of Inlet | 200 cm from Supply point of Inlet | 200 cm from Supply point of Inlet | Same with Supply point of Inlet |
| Assisting Gas for Combustion | Air | Air | Air | Air |
| Calorific Value of Exhaust Gas to be supplied to Inlet [kcal/Nm$^3$] | 478 | 332 | 332 | 332 |
| Calorific Value of Exhaust Gas to be supplied to Outlet [kcal/Nm$^3$] | 83 | 83 | 83 | 83 |
| Consumed Amount of LNG [Nm$^3$/h] | 74 | 90 | 124 | 140 |
| Rate of Reduced LNG $^{Note)}$ | 44% | 32% | 6% | −6% |

$^{Note)}$ "Rate of Reduced LNG" means Ratio of Rate of Reduced LNG vs. Consumed Amount of LNG of Comparative Example 1.

INDUSTRIAL APPLICABILITY

We provide a method of producing a carbon fiber in an economical manner, and the method can broadly be applied to a carbon fiber production method that uses PAN fiber as a precursor fiber thereof.

What is claimed is:

1. A method of producing carbon fiber comprising:
   a carbon fiber production step comprising at least the steps of:
   oxidation in which a precursor fiber is subjected to an oxidation treatment by circulating hot air to obtain an oxidated fiber;
   carbonization in which the oxidated fiber is subjected to a carbonization treatment to obtain a carbon fiber;
   sizing agent-coating in which a sizing agent is coated onto the carbon fiber;
   drying in which drying is performed following the sizing agent-coating step; and
   an exhaust gas processing step in which an exhaust gas obtained at least from the oxidation step, the carbonization step, and the drying step is subjected to combustion processing in an exhaust gas combustion apparatus;
   wherein said exhaust gas processing step comprises the steps of: heat exchanging in which a processed exhaust gas discharged from the exhaust gas combustion apparatus is allowed to exchange heat with an untreated external air to obtain a heated external air; external air mixing in which the heated external air is admixed with an untreated external air to obtain a mixed external air;

and mixed external air supplying in which the mixed external air is supplied to at least one of the step that uses heated gas, among the steps in the carbon fiber production step; and among the exhaust gases, a high heating value exhaust gas having a heating value of 250 kcal/Nm$^3$ or higher is supplied to the inlet side of the exhaust gas combustion apparatus and a low heating value exhaust gas having a heating value lower than 150 kcal/Nm$^3$ is supplied to the outlet side of the exhaust gas combustion apparatus, respectively.

2. A method of producing carbon fiber comprising:

a carbon fiber production step comprising at least the steps of:

oxidation in which a precursor fiber is subjected to an oxidation treatment by circulating hot air to obtain an oxidated fiber;

carbonization in which the oxidated fiber is subjected to a carbonization treatment to obtain a carbon fiber; and an exhaust gas processing step in which an exhaust gas obtained at least from the oxidation step and the carbonization step is subjected to a combustion processing in an exhaust gas combustion apparatus;

wherein said exhaust gas processing step comprises the steps of: heat exchanging in which a processed exhaust gas discharged from the exhaust gas combustion apparatus is allowed to exchange heat with an untreated external air to obtain a heated external air; external air mixing in which the heated external air is admixed with an untreated external air to obtain a mixed external air; and mixed external air supplying in which the mixed external air is supplied to at least one of the step that uses heated gas, among the steps in the carbon fiber production step; and among the exhaust gases, a high heating value exhaust gas having a heating value of 250 kcal/Nm$^3$ or higher is supplied to the inlet side of the exhaust gas combustion apparatus and a low heating value exhaust gas having a heating value lower than 150 kcal/Nm$^3$ is supplied to the outlet side of the exhaust gas combustion apparatus, respectively.

3. The carbon fiber production method according to claim 1, wherein the temperature and the flow rate of the mixed external air are adjusted by adjusting the flow rates of the heated external air and an untreated external air.

4. The carbon fiber production method according to claim 1, wherein the high heating value exhaust gas is supplied to the exhaust gas combustion apparatus through an inlet side supply port provided at the inlet side, and the low heating value exhaust gas is supplied to the exhaust gas combustion apparatus through an outlet side supply port provided 150 cm or further away from the supply port for the high heating value exhaust gas that is the closest to the inlet side.

5. The carbon fiber production method according to claim 2, wherein the temperature and the flow rate of the mixed external air are adjusted by adjusting the flow rates of the heated external air and an untreated external air.

6. The carbon fiber production method according to claim 2, wherein the high heating value exhaust gas is supplied to the exhaust gas combustion apparatus through an inlet side supply port provided at the inlet side, and the low heating value exhaust gas is supplied to the exhaust gas combustion apparatus through an outlet side supply port provided 150 cm or further away from the supply port for the high heating value exhaust gas that is the closest to the inlet side.

7. The carbon fiber production method according to claim 3, wherein the high heating value exhaust gas is supplied to the exhaust gas combustion apparatus through an inlet side supply port provided at the inlet side, and the low heating value exhaust gas is supplied to the exhaust gas combustion apparatus through an outlet side supply port provided 150 cm or further away from the supply port for the high heating value exhaust gas that is the closest to the inlet side.

8. The carbon fiber production method according to claim 5, wherein the high heating value exhaust gas is supplied to the exhaust gas combustion apparatus through an inlet side supply port provided at the inlet side, and the low heating value exhaust gas is supplied to the exhaust gas combustion apparatus through an outlet side supply port provided 150 cm or further away from the supply port for the high heating value exhaust gas that is the closest to the inlet side.

* * * * *